T. F. SCOTT.
SHOCK ABSORBER.
APPLICATION FILED AUG. 9, 1912.
1,067,444.
Patented July 15, 1913.
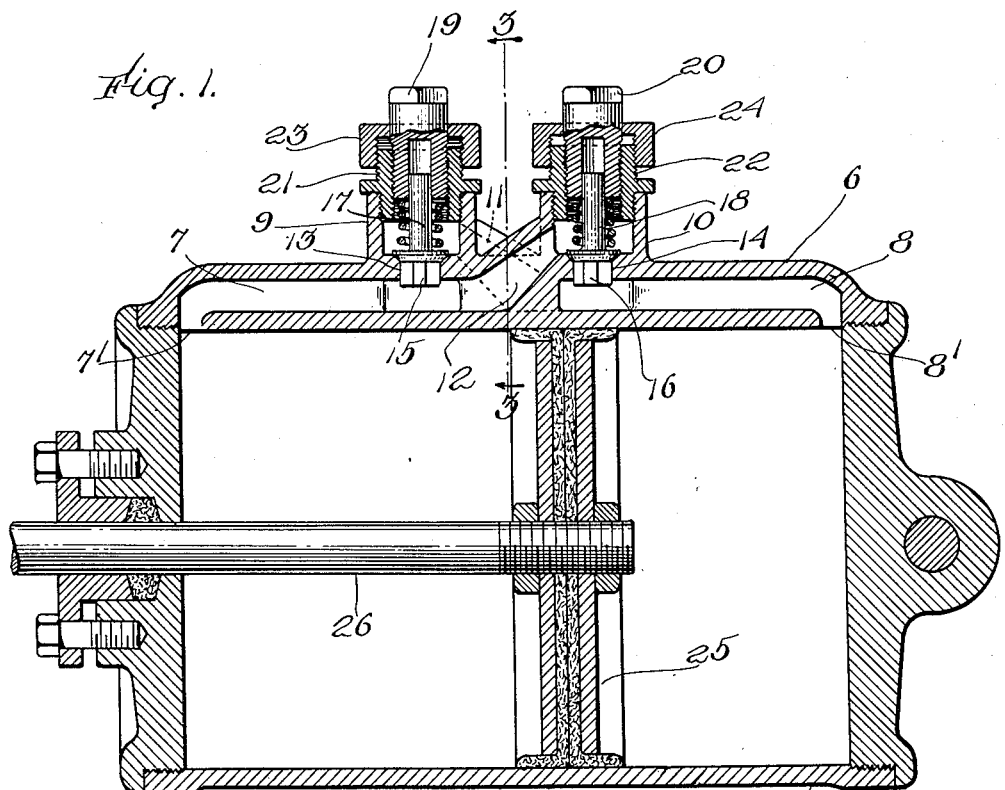
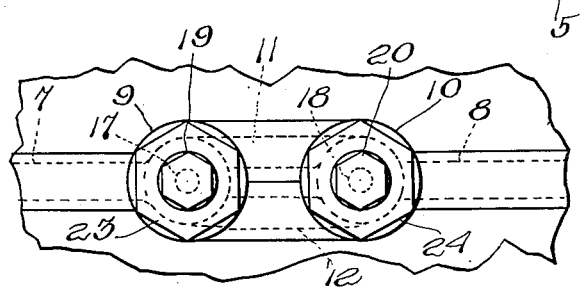
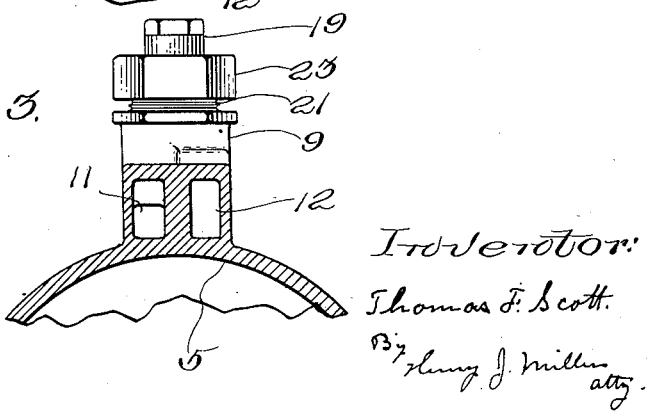
Witnesses:
L. B. Weymouth.
E. C. Murphy.
Inventor:
Thomas F. Scott.
By Henry J. Miller
atty.

UNITED STATES PATENT OFFICE.

THOMAS F. SCOTT, OF EVERETT, MASSACHUSETTS.

SHOCK-ABSORBER.

1,067,444.  Specification of Letters Patent.  Patented July 15, 1913.

Application filed August 9, 1912.   Serial No. 714,200.

*To all whom it may concern:*

Be it known that I, THOMAS F. SCOTT, of Everett, in the county of Middlesex and State of Massachusetts, have invented certain new and useful Improvements in Shock-Absorbers, of which the following is a specification, reference being had to the accompanying drawings, forming part thereof.

This invention has reference to improvements in shock absorbers, so called, and resides particularly in pressure equalizing means applicable to such shock absorbers and devices of similar nature.

The object of the invention is effectually to equalize the pressure at both sides of a piston head or similar device.

Other objects of the invention will appear from the following description.

The invention consists of a yielding pressure resisting device in communication with the pressure side of a second and independently adjustable yielding pressure resisting device.

The invention consists still further in the plural valves independently adjustable and in the means for delivering pressure fluid from the escape side of one valve to the pressure side of the other valve.

The invention also consists in such other novel features of construction and combination of parts as shall hereinafter be more fully described and pointed out in the claims.

Figure 1, represents a vertical sectional view of the preferred form of this improved pressure equalizer applied to a shock absorber cylinder. Fig. 2, represents a plan view of portions of the same. Fig. 3, represents a partial sectional view taken on line 3—3 Fig. 1.

Similar reference characters designate corresponding parts throughout.

As shown in the drawings in its preferred form 5 indicates a cylinder having the wall 6 furnished with the channels 7 and 8 having the respective ports or openings 7′ and 8′ communicating with the interior of cylinder 5. The wall 6 is furnished with the chambers 9 and 10, of which chamber 9 communicates with channel 8 by means of duct 11 and chamber 10 communicates with channel 7 by duct 12 while further communication between said channels 7 and 8 respectively with said chambers 9 and 10 is afforded by the valve openings 13 and 14 in which the valves 15 and 16 are movably seated and are pressed against their seats by their respective springs 17 and 18, which are adjusted by the screw plugs 19 and 20 mounted in bores of the bushings 21 and 22 screwed into the walls of said chambers 9 and 10 and having the screw caps 23 and 24 which may form packing compression members.

Within the piston 5 is movable the piston head 25 having the piston rod 26 slidable through a bearing or bore in one end of said cylinder and said piston rod 26 and cylinder 5 are adapted to be mounted on or connected with two relatively movable parts or mechanisms the movements of one or both of which it is desired to control to some extent or to resist by air or other fluid or liquid pressure medium contained within the cylinder 5.

With the parts in the positions shown in the drawings the pressure is equal throughout the cylinder 5, the channels 7 and 8, the ducts 11 and 12 and the chambers 9 and 10 at the relief sides of the valves 15 and 16. If now the piston head be moved suddenly toward that end of cylinder 5 communicating with port 7′ of channel 7 the pressure will be increased at that side of said piston head and in channel 7 as well as in duct 12 and chamber 10 so that valve 15 will yield if the pressure is sufficient, against the action of its spring, thus opening a passage for the pressure fluid into the chamber 9 whence said fluid is free to pass through the duct 11 into channel 8 at the pressure side of valve 16. If on the contrary the piston head moves toward port 8′ of channel 8 the pressure medium will effect the opening of valve 16 and from the relief side of said valve will pass through duct 12 into channel 7 at the pressure side of valve 15. Valves 15 and 16 are independent in their operation and their springs 17 and 18 may be independently adjusted as to their pressure on said valves by means of the screw plugs 19 and 20.

While I have herein shown this improved pressure equalizing device as applied to a cylinder it is not my intention to limit my invention in any manner thereby.

Having thus described my invention I claim as new and desire to secure by Letters Patent—

1. A shock absorber comprising a series of independent valve chambers having valve seats communicating with separate channels and ducts each leading from one of said valve chambers to a channel communicating with the valve seat of another of said valve chambers, and valves in said seats.

2. A shock absorber comprising a series of valve seats, channels extending from said seats and ducts leading from the relief sides of said valve seats to channels at the pressure sides of other of said valve seats, valves movably mounted in said seats and independently adjustable spring pressure devices for said valves.

3. A shock absorber comprising a pair of valve chambers having valve seats, channels into which said seats open and ducts leading from the relief side of each valve seat to the channel opening into the other of said valve seats, and spring pressed valves in said seats and adapted to be moved by undue pressure in said channels.

4. A shock absorber comprising a cylinder having a pair of channels communicating therewith, a pair of valve chambers having valve seats opening into said channels respectively and ducts extending from the relief sides of said valve seats respectively to the pressure sides of the other of said valve seats, valves in said seats, springs acting against said valves, bushings mounted on or in said valve chambers, and screw plugs in said bushings and bearing against said springs substantially as described.

5. A shock absorber comprising a cylinder, and two automatic relief valves for controlling pressure at the respective ends of said cylinder, said valves having valve chambers and ducts leading respectively from the relief sides of said valves to the pressure sides of the related valves and to the respective ends of the cylinder, substantially as described.

THOMAS F. SCOTT.

Witnesses:
ESTHER MURPHY,
C. B. HILL.